United States Patent [19]

Ström

[11] 4,266,651
[45] May 12, 1981

[54] TRANSPORT DEVICE

[75] Inventor: Holger Ström, Lysekil, Sweden

[73] Assignee: Platmanufaktur Aktiebolaget, Malmo, Sweden

[21] Appl. No.: 958,425

[22] Filed: Nov. 7, 1978

[30] Foreign Application Priority Data

Nov. 16, 1977 [SE] Sweden ............................ 7712932

[51] Int. Cl.$^3$ ............................................ B65G 47/00
[52] U.S. Cl. .................................. 198/345; 198/491; 198/611
[58] Field of Search .............. 198/339, 345, 346, 475, 198/491, 502, 611, 461; 250/223 B

[56] References Cited

U.S. PATENT DOCUMENTS

| 2,619,217 | 11/1952 | Merrill | 198/491 X |
| 2,681,758 | 6/1954 | Lipson | 198/339 X |
| 3,036,624 | 5/1962 | Carter | 198/461 X |
| 3,133,640 | 5/1964 | Calhoun et al. | 250/223 B X |
| 3,279,581 | 10/1966 | Drennan | 198/491 X |
| 3,710,937 | 1/1973 | Cook | 198/611 X |
| 3,745,314 | 7/1973 | Mathias et al. | 250/223 B X |
| 3,833,110 | 9/1974 | Riggs | 198/475 X |

FOREIGN PATENT DOCUMENTS 2553989 8/1976 Fed. Rep. of Germany.
360332 9/1973 Sweden.

Primary Examiner—James L. Rowland
Attorney, Agent, or Firm—Hane, Roberts, Spiecens & Cohen

[57] ABSTRACT

Apparatus for moving containers such as bottles to and from a position in which each container is fixed, at least during a predetermined interval of time. The apparatus comprises a feed screw and a discharge screw separated from one another to define a station therebetween at which each container is periodically halted. A wall extends along each screw and cooperates therewith to guide each container respectively into and from the station. A rotatable sprocket is mounted at the station and has adjacent teeth between which the containers are successively received from the feed screw and fed to the discharge screw. The sprocket is freely rotatable and undergoes stepwise movement under the action of contact of the successive containers with the teeth of the sprocket. Each container is fed by the feed screw to the station to cause the sprocket to rotate and to position the container at the station between the feed screw and the discharge screw, the previously halted container at the station being advanced by the rotation of the sprocket to travel to the discharge screw.

12 Claims, 4 Drawing Figures

TRANSPORT DEVICE

FIELD OF THE INVENTION

This invention relates to a device for conveying containers to and from a position in which the containers are fixed during a period of time and where feed screws are arranged for conveying the containers to and from the aforementioned position.

PRIOR ART

There exists a need to convey containers, such as bottles, in many different connections in the manner described in the previous paragraph. Devices for achieving a pattern of movement of this kind are required in connection with inspection, filling and/or labelling of containers, for example, and also in many other similar connections.

SUMMARY OF THE INVENTION

An object of this invention is to provide a device for achieving the abovementioned pattern of movement of containers. In the device a feed screw, a discharge screw and a fixing element located between these screws all interact with each other. Incorporated in the fixing element are one or more sprockets the teeth of which in turn interact with a number of spring-loaded locating pins. In the stationary position the individual container is held and fixed in that it is pressed by the spring-loaded locating pins between adjacent teeth of the respective sprocket.

The sprockets are free-running or possibly slightly braked in their rotational movements. A container that is on its way to the stationary position is carried by the feed screw into the space between two of the sprocket teeth. During the continued movement of the container towards the stationary position the sprockets accompany the container. Rotation of the sprockets is thus achieved by the feed screw in that a container in the feed position transfers the motion of the feed screw to the sprocket.

On its way to the stationary position, the container passes a number of spring-loaded locating pins after the feed screw which in the course of their spring-loaded movements set on the container in the necessary manner to bring it into the correct attitude in the stationary position. A number of spring-loaded locating pins situated before the discharge screw act as stop elements which prevent continued movement of the container. The locating pins adjacent to the feed screw and the discharge screw respectively thus abut against the body of the container and thereby press the container against the sprocket at the same time that the locating pins prevent the container from being moved in the longitudinal direction of the feed screw.

The container remains in its stationary position until the feed screw has moved the immediately following container into position against the tooth or teeth of the respective sprocket situated between the stationary container and the one immediately following it. During the continued movement the feed screw consequently moves the immediately following container towards the stationary position. The container that was previously situated in the stationary position thereby simultaneously begins moving towards the discharge screw. Both containers do not, however, come into contact with each other but are separated from each other by the previously-mentioned teeth of the sprockets. During the continued movement towards the discharge screw the previously stationary container presses the spring-loaded locating pins out of the way in order to allow the container to move to a position where the discharge screw can take over the container. Simultaneously, the immediately following container passes into the stationary position.

From the above description it will be evident that contact between adjacent containers is prevented during their passage to and from the stationary position as well as in this position because the teeth of one or more sprockets are always situated between the containers.

BRIEF DESCRIPTION OF THE DRAWING

The invention is described in detail with reference to the four figures of the drawing, wherein.

DETAILED DESCRIPTION

Figure 1:
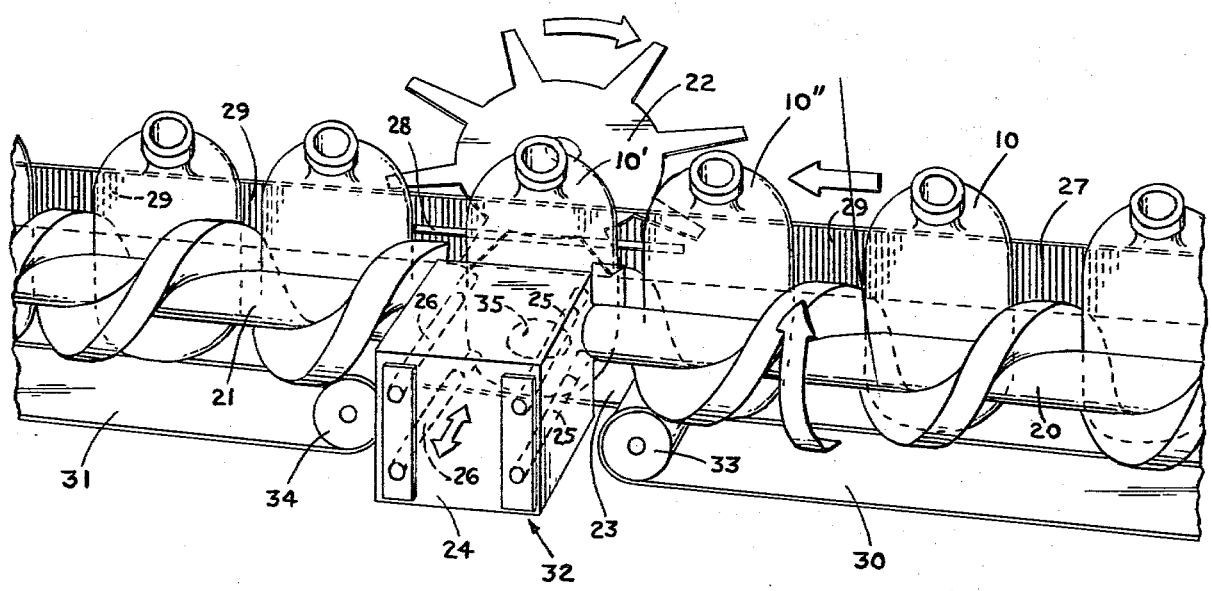
FIG. 1 is a perspective view of the feed screw, discharge screw and intermediate fixing station.

In FIGS. 1-4 are seen a feed screw 20, a discharge screw 21 and a fixing station 32 situated between the feed screw and the discharge screw. The feed and discharge screws interact with a locating element or stop 27 which is covered with a frictional material and which in addition may be arranged with studs, ribs or similar elements 29 in order to increase friction. The feed and discharge screws also interact with conveyor belts 30, 31. The conveyor belts are arranged in the form of endless loops which at their reversing points pass around rollers 33, 34. Rollers are also arranged at other reversing points. Some of these rollers are drive rollers for moving the belts.

Fixing station 32 consists of one or more sprockets 22 situated on one side of the path described by the container and of a fixing housing 24 opposite the sprockets and consequently situated on the opposite side of the path along which the containers move. The teeth of the sprockets pass through openings 28 in the locating element or stop 27. Arranged in the fixing housing are a number of spring-loaded locating pins 25 situated adjacent to the feed screw and a number of spring-loaded locating pins 26 situated adjacent to the discharge screw. The sprockets with their teeth and the fixing housing with its locating pins are so arranged and so situated in relation to each other that between two adjacent teeth on the sprockets and the locating pins 25 adjacent to the feed screw and the locating pins 26 adjacent to the discharge screw a space is formed that is adapted to the dimensions of the container that is placed in the fixing position. From this it will be understood that a container in the fixing position is pressed by the locating pins between adjacent teeth on the sprocket or sprockets 22.

In the space between the conveyor belts 30, 31 is arranged a bottom plate 23. In the bottom plate a hole 35 is adapted to the size of the bottom area of the containers, for example, or to the size and position of any marks cast into or embossed in the container. In certain versions the hole 35 is arranged with a plate, the upper surface of which is flush with the upper surface of the bottom plate, the plate permitting the passage of detection rays, for example.

A number of containers 10 are also depicted in the figures.

Figure 2:
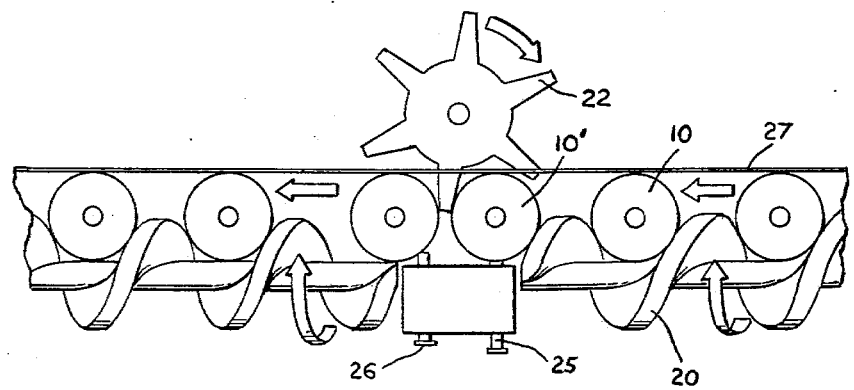
FIG. 2 shows a container on its way to the fixing station.

From FIG. 2 it is particularly evident how a container 10' on being carried to the fixing position by the feed screw 20 is pressed against the stop 27 and against a tooth of sprocket 22. The figure also shows how during this movement the container presses the spring-loaded locating pins 25 out of the way.

Figure 3:
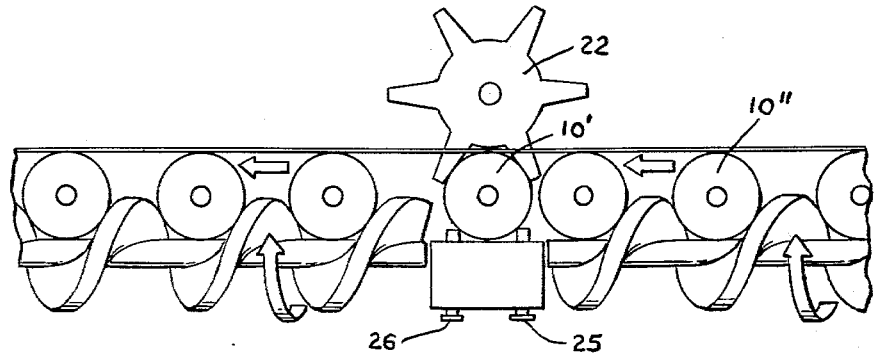
FIG. 3 shows a container in the fixing station.

In FIG. 3 the container 10' has been brought into position for fixing. It is hereby pressed by the spring-loaded locating pins 25, 26 against two adjacent teeth of the sprocket 22 and is thereby held in this position. The sprocket 22 is stationary until the immediately following container 10" reaches the tooth of the sprocket.

Figure 4:
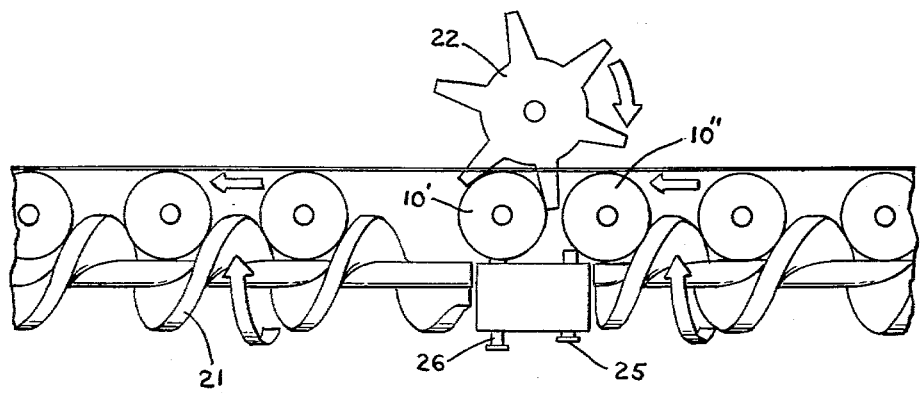
FIG. 4 shows a container on its way out of the fixing station.

In FIG. 4 the immediately following container 10" has reached a position where it effects the movement of the sprocket. The sprocket thereby rotates and moves the container 10' from the position in which the container is fixed at the same time as the container presses the spring-loaded locating pins 26 out of the way. During the continued movement of container 10" towards the position for fixing, container 10' is moved to a position where the discharge screw 21 takes over the continued movement of the container.

Over and above what has been stated above with regard to the method of operation of the invention, each and every one of the containers rotates about its own axis while the feed screws move the containers. This rotational movement is achieved by the interaction of reaction forces from the feed screws 20, 21 and the stop 27.

The conveyor belts 30, 31 are replaced in an alternative version by suitable supporting elements, such as stationary plates carrying the containers.

The period of time during which the container is in position for fixing is determined by the time required for inspection equipment, for example, to perform the necessary inspection, for identification equipment to analyze marks cast into or embossed in the container, for example, for filling equipment to fill the containers with goods, etc. The length of the necessary interval consequently determines the capacity of a device according to the invention.

In keeping with the concept of the invention it is also possible to arrange the feed and discharge screws with different rates of rotation and/or with different pitches. In certain applications the screws are arranged with a pitch that increases or decreases in the direction of movement of the containers.

What is claimed is:

1. Apparatus for moving containers, such as bottles, to and from a position in which each container is fixed at least during a predetermined interval of time, said apparatus comprising a feed screw and a discharge screw separated from each other to define a station therebetween at which each container is periodically halted, a stop cooperating with said feed screw and discharge screw for guiding each container respectively into and from said station, rotatable sprocket means at said station having adjacent teeth between which the containers are successively received from the feed screw and fed to the discharge screw, said sprocket means being freely rotatable and undergoing movement under the action of contact of the successive containers fed by the feed screw with the teeth of said sprocket means, each container being fed by said feed screw towards said station to engage one of the teeth of the sprocket means and cause the sprocket means to rotate freely as the container is transported to said station between the feed screw and the discharge screw, the previous container at said station being concurrently advanced by the rotation of the sprocket means to said discharge screw and means for engaging the container at said station to press the container against the sprocket means to halt the container and thereby the sprocket means until the next successive container contacts a tooth of the sprocket means and rotates the sprocket means anew.

2. Apparatus as claimed in claim 1 wherein the means for pressing the container against the sprocket means comprises a pair of spaced spring-loaded members.

3. Apparatus as claimed in claim 2 wherein said spring-loaded members are pins.

4. Apparatus as claimed in claim 1 comprising frictional material on said stop facing the containers.

5. Apparatus as claimed in claim 4 wherein said frictional material comprises vertically oriented rib-like elements.

6. Apparatus as claimed in claim 1 comprising a conveyor belt cooperating with said feed screw and carrying the containers during their movement towards said station and a further conveyor belt cooperating with said discharge screw and carrying the containers during their movement from said station.

7. Apparatus as claimed in claim 1 wherein said feed screw and discharge screw are adjustable in respect of rotational speed.

8. Apparatus as claimed in claim 1 comprising a bottom plate between said screws for conveying each container to and from said station supporting each container at said station, said bottom plate being provided with an inspection hole corresponding in size to the bottom dimensions of each container and permitting the passage of detection rays.

9. Apparatus as claimed in claim 8 comprising a further plate at said inspection hole and having an upper surface which is flush with the upper surface of said bottom plate, said further plate permitting the passage of the detection rays.

10. Apparatus as claimed in claim 1 wherein said sprocket means comprises at least one sprocket wheel.

11. Apparatus as claimed in claim 10 wherein a number of sprocket wheels are arranged one above the other and with openings between their teeth adapted to the shape of the containers where the respective sprocket engages the containers.

12. Apparatus as claimed in claim 1 wherein said stop is provided with at least one opening to allow the teeth of the sprocket means to pass therethrough during rotation of the sprocket means over the path along which the containers are moved.

* * * * *